(12) United States Patent
Nagayasu et al.

(10) Patent No.: US 9,901,872 B2
(45) Date of Patent: Feb. 27, 2018

(54) AIR POLLUTION CONTROL SYSTEM

(71) Applicant: MITSUBISHI HEAVY INDUSTRIES, LTD., Tokyo (JP)

(72) Inventors: Hiromitsu Nagayasu, Tokyo (JP); Takashi Kamijo, Tokyo (JP); Yuichiro Sato, Tokyo (JP); Takuya Hirata, Tokyo (JP); Hiroshi Tanaka, Tokyo (JP); Kouji Horizoe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 9 days.

(21) Appl. No.: 14/407,866

(22) PCT Filed: Jun. 5, 2013

(86) PCT No.: PCT/JP2013/065591
§ 371 (c)(1),
(2) Date: Dec. 12, 2014

(87) PCT Pub. No.: WO2013/187294
PCT Pub. Date: Dec. 19, 2013

(65) Prior Publication Data
US 2015/0139861 A1    May 21, 2015

(30) Foreign Application Priority Data
Jun. 15, 2012   (JP) ................. 2012-136069

(51) Int. Cl.
*B01D 53/62*    (2006.01)
*B01D 53/78*    (2006.01)
(Continued)

(52) U.S. Cl.
CPC ......... *B01D 53/62* (2013.01); *B01D 53/1475* (2013.01); *B01D 53/18* (2013.01);
(Continued)

(58) Field of Classification Search
CPC .... B01D 2252/204; B01D 2252/20478; B01D 2257/504; B01D 2258/0283;
(Continued)

(56) References Cited

U.S. PATENT DOCUMENTS 4,251,238 A    2/1981  Claes et al.
4,954,256 A    9/1990  Degen et al.
(Continued)

FOREIGN PATENT DOCUMENTS

EP    0 418 058 A1    3/1991
EP    0418058 A1 *   3/1991    ............. B01D 50/00
(Continued)

OTHER PUBLICATIONS

English translation of JP 03000187 accessed Jan. 12, 2016.*
(Continued)

*Primary Examiner* — Cabrena Holecek
(74) *Attorney, Agent, or Firm* — Westerman, Hattori, Daniels & Adrian, LLP

(57) ABSTRACT

An air pollution control system includes $CO_2$ absorber that removes $CO_2$, and an absorbent regenerator that releases $CO_2$ from the amine absorbent. The $CO_2$ absorber is equipped with a $CO_2$ absorption unit that absorbs $CO_2$ in the flue gas by the amine absorbent (lean solution), and a water-repellent filter unit that is provided on an upper part (gas flow downstream) side of the $CO_2$ absorption unit and collects the mist amine absorbent accompanied by the $CO_2$-free flue gas. The mist amine accompanied by the $CO_2$-free flue gas is collected.

6 Claims, 14 Drawing Sheets

(51) Int. Cl.
  *C01B 31/20* (2006.01)
  *B01D 53/14* (2006.01)
  *B01D 53/18* (2006.01)
  *B01D 46/00* (2006.01)

(52) U.S. Cl.
  CPC .............. *B01D 53/78* (2013.01); *C01B 31/20* (2013.01); *B01D 46/003* (2013.01); *B01D 2252/204* (2013.01); *B01D 2252/20478* (2013.01); *B01D 2257/504* (2013.01); *B01D 2258/0283* (2013.01); *Y02C 10/04* (2013.01); *Y02C 10/06* (2013.01); *Y02P 20/152* (2015.11)

(58) Field of Classification Search
  CPC .. B01D 46/003; B01D 53/1475; B01D 53/18; B01D 53/62; B01D 53/78; C01B 31/20; Y02C 10/04; Y02C 10/06; Y02P 20/152
  See application file for complete search history.

(56) References Cited

U.S. PATENT DOCUMENTS

| | | | |
|---|---|---|---|
| 5,122,169 A | | 6/1992 | Schumacher et al. |
| 5,403,483 A | * | 4/1995 | Hayashida ........... B01D 39/083 210/490 |
| 2003/0045756 A1 | | 3/2003 | Mimura et al. |
| 2011/0135550 A1 | * | 6/2011 | Nagayasu .......... B01D 53/1418 423/230 |

FOREIGN PATENT DOCUMENTS

| | | | |
|---|---|---|---|
| EP | 2 338 583 A2 | | 6/2011 |
| JP | 03000187 A | * | 1/1991 |
| JP | 03-193116 A | | 8/1991 |
| JP | 06-107845 A | | 4/1994 |
| JP | 10-033938 A | | 2/1998 |
| JP | 2002-126439 A | | 5/2002 |
| JP | 2011/115724 A | | 6/2011 |
| JP | 03-000187 A | | 1/2014 |
| RU | 2230599 C2 | | 6/2004 |
| WO | 2011/152547 A1 | | 12/2011 |

OTHER PUBLICATIONS

English Translation of Concise Explanation of Relevance of Japanese Patent Application No. 03-193116 previously submitted on Dec. 12, 2014. (1 page).
Translation of Written Opinion of the International Searching Authority dated Jul. 9, 2013, issued in corresponding Application No. PCT/JP2013/065591. (5 pages).
International Search Report dated Jul. 9, 2013, issued in corresopnding application No. PCT/JP2013/065591.
Written Opinion dated Jul. 9, 2013, issued in corresopnding application No. PCT/JP2013/065591.
Notice of Acceptance dated Oct. 16, 2015, issued in counterpart Australian Application No. 2013275381. (3 pages).
Office Action dated Mar. 28, 2016, issued in counterpart Russian Patent Application No. 2014150561, with English translation ( 8 pages).
Extended (supplementary) European Search Report dated Apr. 29, 2016, issued in counterpart European Patent Application No. 13803856.7. (7 pages).
Notice of Allowance dated Jul. 21, 2016, issued in counterpart Russian Application No. 2014150561. (5 pages).
Notice of Allowance dated Jul. 14, 2016, issued in counterpart Canadian Application No. 2876376 (1 page).
Office Action dated Aug. 2, 2016, issued in counterpart Japanese Application No. 2012-136069 (6 pages).

* cited by examiner

AIR POLLUTION CONTROL SYSTEM

FIELD

The present invention relates to an air pollution control system in which discharge of an amine absorbent to the outside of the system is significantly suppressed when absorbing and removing $CO_2$ in a flue gas by the amine absorbent.

BACKGROUND

In recent years, as one of causes of a global warming phenomenon, a greenhouse effect due to $CO_2$ has been pointed out, and countermeasures against the effect have also become an internationally urgent need in protecting the global environment. A source of generation of $CO_2$ ranges in various fields of human activities in which fossil fuel is combusted, and a demand for suppressing the discharge tends to be further strengthened. Accordingly, directed at a power generation apparatus such as a thermal power plant that uses a large amount of fossil fuel, a method of removing and recovering $CO_2$ in a flue gas by bringing the flue gas of an industrial apparatus, such as a boiler and a gas turbine, into contact with an amine-based $CO_2$ absorbent, and an air pollution control system that stores the recovered $CO_2$ without releasing it to the atmosphere have been extensively studied.

A $CO_2$ recovery unit having a process of bringing a flue gas and a $CO_2$ absorbent into contact with each other in a $CO_2$ absorber (hereinafter, also simply referred to as "absorber"), and a process of heating the $CO_2$ absorbent that has absorbed $CO_2$ in a $CO_2$ absorbent regenerator (hereinafter, also simply referred to as a "regenerator"), diffusing $CO_2$, regenerating the $CO_2$ absorbent and circulating the absorbent to the $CO_2$ absorber again to reuse the $CO_2$ absorbent, as a process of removing and recovering $CO_2$ from the flue gas using the above-described amine-based $CO_2$ absorbent, has been suggested (for example, see Patent Literature 1).

In the $CO_2$ absorber, the flue gas is brought into counter-current contact, for example, with the amine-based $CO_2$ absorbent such as alkanolamine, $CO_2$ in the flue gas is absorbed to the $CO_2$ absorbent by a chemical reaction (exothermic reaction), and the flue gas after removal of $CO_2$ is released out of the system. The $CO_2$ absorbent that has absorbed $CO_2$ is also called a rich solution. The rich solution is increased in pressure by a pump, heated in a heat exchanger by the high-temperature $CO_2$ absorbent (lean solution) obtained by diffusion of $CO_2$ and regeneration in the regenerator, and supplied to the regenerator.

In the $CO_2$ recovery process using the $CO_2$ absorbent, the $CO_2$-free flue gas obtained by removing $CO_2$ from the flue gas is released to the atmosphere. However, since a small part of a small amount of amine absorbent is present in the released gas, it is necessary to reduce an amount of discharge thereof.

In particular, in the future, when the $CO_2$ removal regulation is started, there is a possibility that the $CO_2$ removal device itself increases in size, and thus, it is necessary to further reduce the amount of discharge.

As a technique that prevents the release of the amine absorbent, for example, a method of recovering an amine compound accompanied by a $CO_2$-free flue gas, by providing a plurality of stages of water washing sections on a downstream side of a $CO_2$ absorption section of a $CO_2$ absorber of a $CO_2$ removal device, and by bringing the $CO_2$-free flue gas and washing water into vapor-liquid contact with each other has been suggested (Patent Literature 2).

In addition, as another technique, a method of recovering a basic amine compound in a decarbonator flue gas that sprays a sulfuric acid from a sulfuric acid spray device to a $CO_2$-free flue gas discharged from a $CO_2$ absorber, converts an amine absorbent accompanied by the flue gas into a basic amine compound sulfate, and collects the basic amine compound sulfate has been suggested (Patent Literature 3).

Furthermore, in the air pollution control system, when a mist generation material being a generation source of mist generated in the absorber of the $CO_2$ recovery unit is contained in the flue gas introduced into the $CO_2$ absorber that absorbs $CO_2$ in the $CO_2$ recovery unit, the $CO_2$ absorbent is accompanied by the mist generation material. Therefore, there is a problem that the amount of $CO_2$ absorbent that scatters to the outside of the system increases, and thus, the countermeasures against the problem have been considered (Patent Literature 4).

CITATION LIST

Patent Literature

Patent Literature 1: JP 3-193116 A
Patent Literature 2: JP 2002-126439 A
Patent Literature 3: JP 10-33938 A
Patent Literature 4: WO 2011/152547 A

SUMMARY

Technical Problem

However, in the above-described suggestions, although the gaseous amine absorbent can be reduced in the $CO_2$-free flue gas released from the $CO_2$ absorber, there is a risk of releasing the mist amine absorbent with the flue gas. Accordingly, it is necessary to suppress this problem.

There is concern that the mist amine absorbent released to the outside of the system is converted into, for example, nitrosamines, nitramine, aerosol or the like as a result of reaction with NOx or the like in the atmosphere after diffusion into the atmosphere.

Thus, there has been a desire for establishment of an air pollution control system that can further suppress the release of the amine compound accompanied by the $CO_2$ flue gas from the $CO_2$ absorber.

In view of the above-described problems, an object of the present invention is to provide an air pollution control system that is capable of greatly suppressing entrainment of the amine absorbent when discharging the treated flue gas, from which $CO_2$ is removed, to the outside of the system.

Solution to Problem

According to a first aspect of the present invention in order to solve the above-mentioned problems, there is provided an air pollution control system including a $CO_2$ recovery unit equipped with a $CO_2$ absorber that removes $CO_2$ in a flue gas from a boiler by an amine absorbent, and an absorbent regenerator that regenerates the amine absorbent, wherein the $CO_2$ absorber is equipped with a $CO_2$ absorption unit that absorbs $CO_2$ in the flue gas by the amine absorbent, and a water-repellent filter unit that is disposed on a gas flow downstream side of the CO2 absorption unit and collects mist amine absorbent accompanied by a $CO_2$-free flue gas.

According to a second aspect of the present invention, there is provided the air pollution control system according to the first aspect, wherein the water-repellent filter unit is equipped with a filter cylinder having a gas introduction space into which the $CO_2$-free flue gas rising from the $CO_2$ absorption unit is introduced, and a plurality of water-repellent filters provided on a side surface of the filter cylinder to allow the introduced $CO_2$-free flue gas to pass through the filters in a direction orthogonal to a gas flow direction.

According to a third aspect of the present invention, there is provided the air pollution control system according to the second aspect, wherein a cleaning unit for cleaning a gas in-flow surface of the water-repellent filter is provided in the filter cylinder.

According to a fourth aspect of the present invention, there is provided the air pollution control system according to the second or third aspect, wherein a collecting unit for collecting falling water falling down along the surface of the filter is provided on a lower end side of the water-repellent filter.

According to a fifth aspect of the present invention, there is provided the air pollution control system according to the first aspect, wherein the water-repellent filter unit is integrally provided within the $CO_2$ absorber.

According to a sixth aspect of the present invention, there is provided the air pollution control system according to the first aspect, Wherein the water-repellent filter unit is provided separately from the $CO_2$ absorber.

According to a seventh aspect of the present invention, there is provided the air pollution control system according to the first aspect, wherein a water cleaning unit is provided on one or both of an upstream side and a downstream side of the gas flow of the water-repellent filter unit.

Advantageous Effects of Invention

According to the air pollution control system of the present invention, by collecting the mist amine accompanied by the $CO_2$-free flue gas using a water-repellent filter, it is possible to further reduce the amine concentration of the gas diffused to the atmosphere.

DESCRIPTION OF EMBODIMENTS

Preferred embodiments of the present invention will be described in detail with reference to the attached drawings. Note that the present invention is not intended to be limited by these embodiments. When there is a plurality of embodiments, the present invention also includes an embodiment configured by combining the embodiments.

First Embodiment

Figure 1:
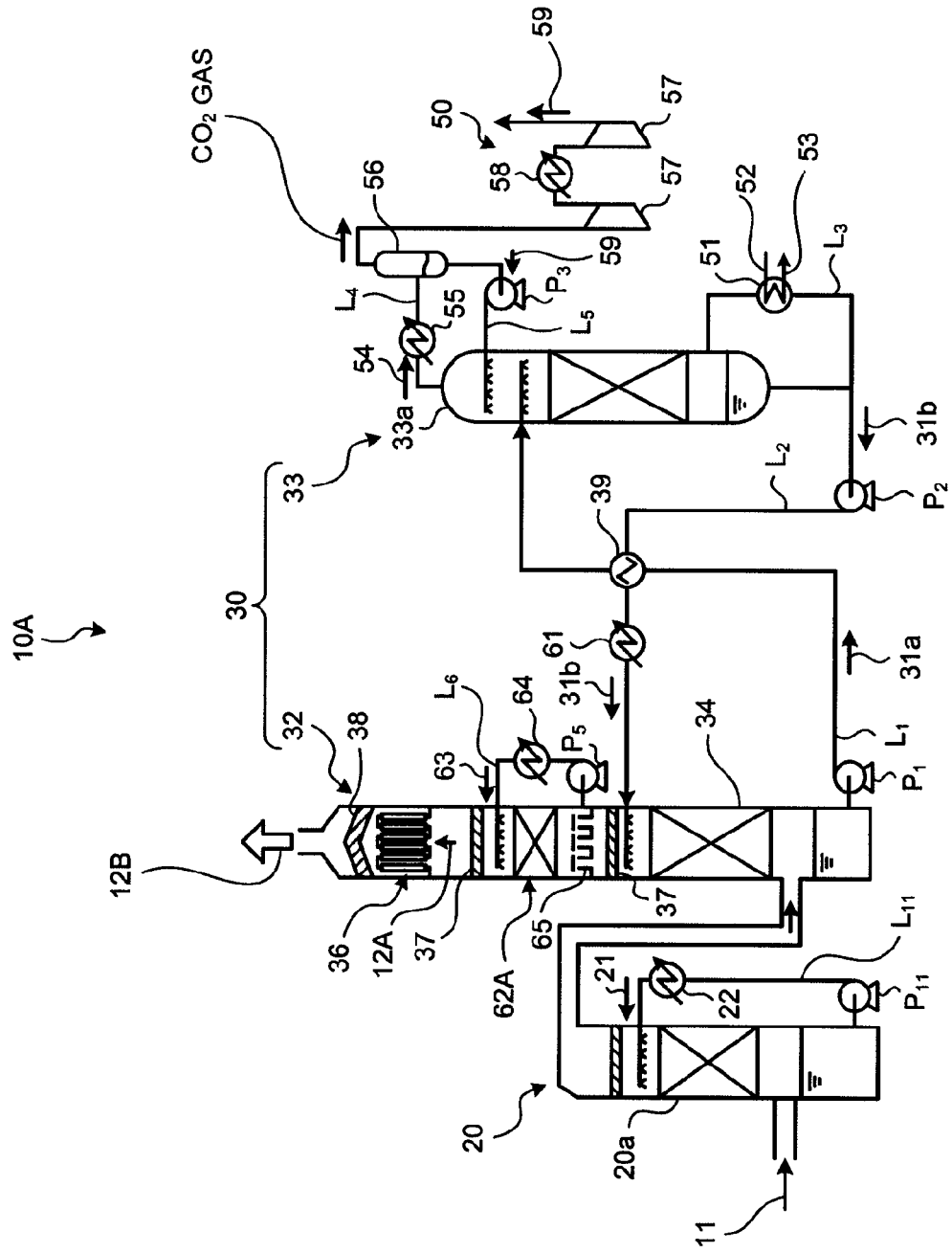
FIG. 1 is a schematic diagram of an air pollution control system provided with a $CO_2$ recovery unit according to a first embodiment.

FIG. 1 is a schematic diagram of an air pollution control system provided with a $CO_2$ recovery unit according to a first embodiment.

As illustrated in FIG. 1, an air pollution control system 10A provided with a $CO_2$ recovery unit according to the present embodiment is a $CO_2$ recovery apparatus that removes $CO_2$ contained in a coal combustion flue gas (hereinafter, referred to as "flue gas") 11 discharged from, for example, a coal combustion boiler. The air pollution control system 10A has a cooling tower 20 that cools the flue gas 11, a $CO_2$ recovery unit 30 that removes $CO_2$, and a $CO_2$ compression apparatus 50 that compresses $CO_2$ recovered in the $CO_2$ recovery unit 30 to be $CO_2$ gas of high purity.

In the present embodiment, a first water cleaning unit 62A is provided between a $CO_2$ absorption unit 34 and a water-repellent filter unit 36 in a $CO_2$ absorber 32.

In the first water cleaning unit 62A, the flue gas comes into gas-liquid contact with a cleaning water 63 supplied from the tower top side, and a part of the liquefied amine absorbent and the gaseous amine absorbent accompanied by a $CO_2$-free flue gas 12A is removed prior to introduction into the water-repellent filter unit 36.

In the present embodiment, on a gas flow downstream side of the first water cleaning unit 62A, a demister 37 which is a glass fiber filter is installed.

The cooling tower 20 has a cooling part 20a that injects cooling water 21 from the top side of the cooling tower and brings the cooling water 21 into countercurrent contact with the flue gas 11 introduced from the lower part. Thereby, the gas temperature is reduced to a predetermined temperature, and the cooling water 21 is reused by a circulation line $L_{11}$, a circulation pump $P_{11}$, and a cooler 22.

The $CO_2$ recovery unit 30 that removes $CO_2$ in the flue gas 11 after cooling has a $CO_2$ absorber (hereinafter, also referred to as an "absorber") 32 that removes $CO_2$ by bringing the flue gas 11 introduced from a lateral surface side of the tower lower end into countercurrent contact with the amine absorbent (lean solution) serving as a $CO_2$ absorbent, and an absorbent regenerator (hereinafter, also referred to as a "regenerator") 33 that releases $CO_2$ from the amine absorbent (rich solution 31a) that has absorbed $CO_2$ and regenerates the amine absorbent, and the $CO_2$ recovery unit 30 supplies a lean solution 31b from which $CO_2$ is removed by the absorbent regenerator 33 to the $CO_2$ absorber 32 side so as to be used as the amine absorbent (lean solution) again.

In FIG. 1, reference numeral $L_1$ represents a rich solution supply line, $L_2$ represents a lean solution supply line, $L_3$ represents a reboiler circulation line, $L_4$ represents a gas discharge line, $L_5$ represents a condensed water line, $L_6$ represents a cleaning fluid circulation line, $P_5$ represents a circulation pump, reference numeral 64 represents a cooler, and reference numeral 65 represents a chimney tray.

The $CO_2$ absorber 32 is provided with the $CO_2$ absorption unit 34 that absorbs $CO_2$ in the flue gas 11 by the amine absorbent (lean solution 31b), and the water-repellent filter unit 36 that is provided on an upper portion (gas flow downstream) side of the $CO_2$ absorption unit 34 and collects the mist amine absorbent accompanied by the $CO_2$-free flue gas 12A.

Figure 2:
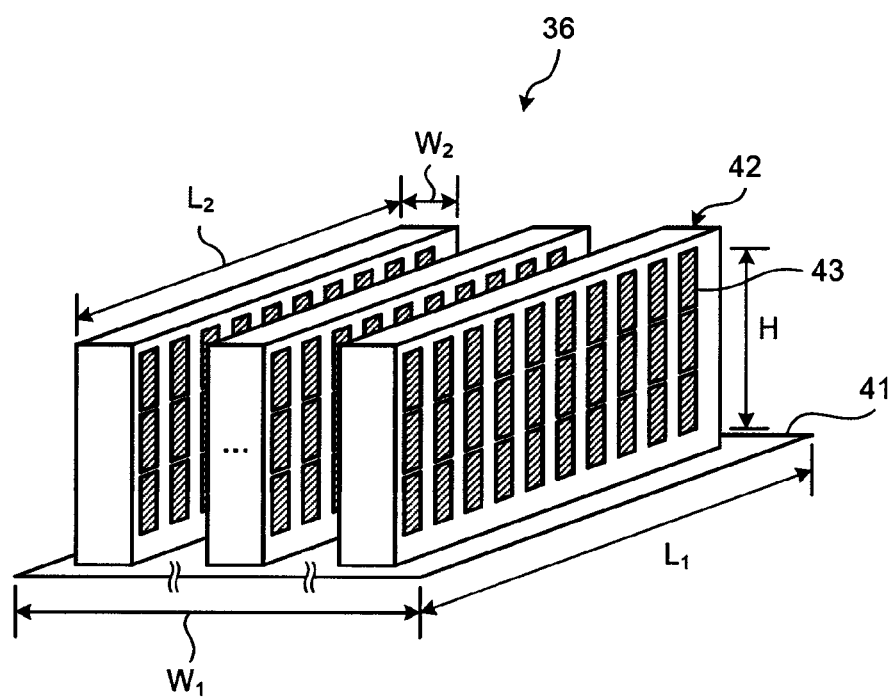
FIG. 2 is a perspective view of a water-repellent filter unit according to the first embodiment.
Figure 3:
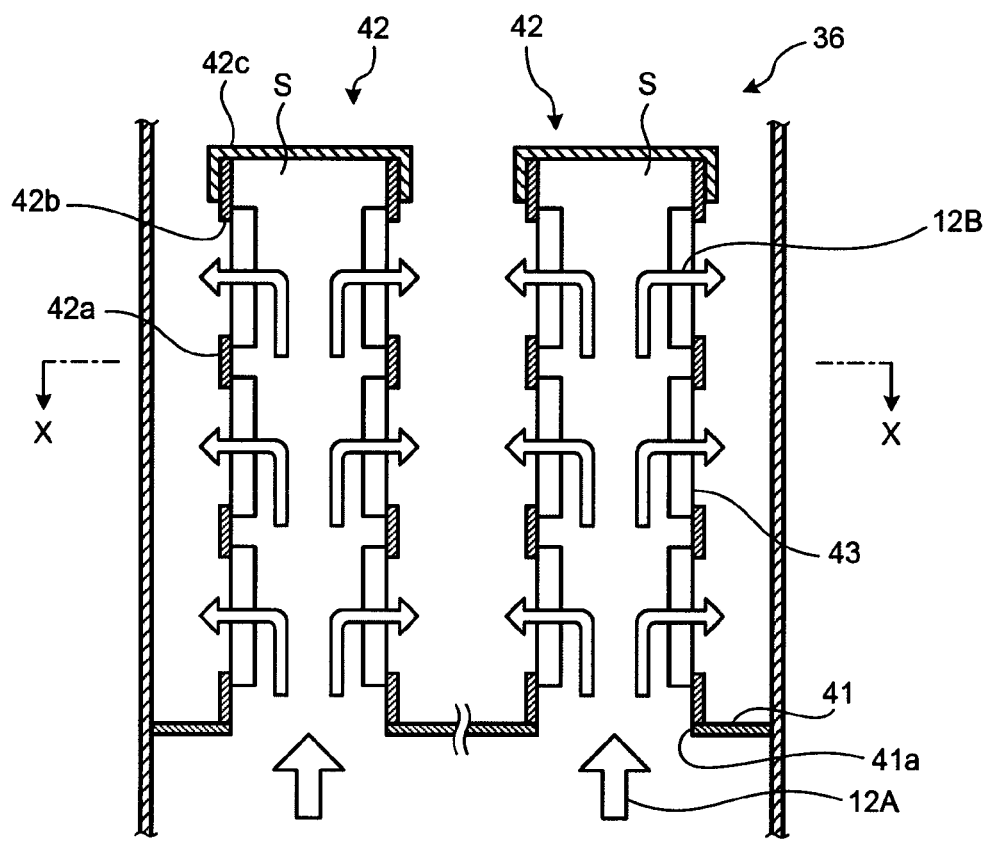
FIG. 3 is a longitudinal cross-sectional view of the water-repellent filter unit according to the first embodiment.
Figure 4:
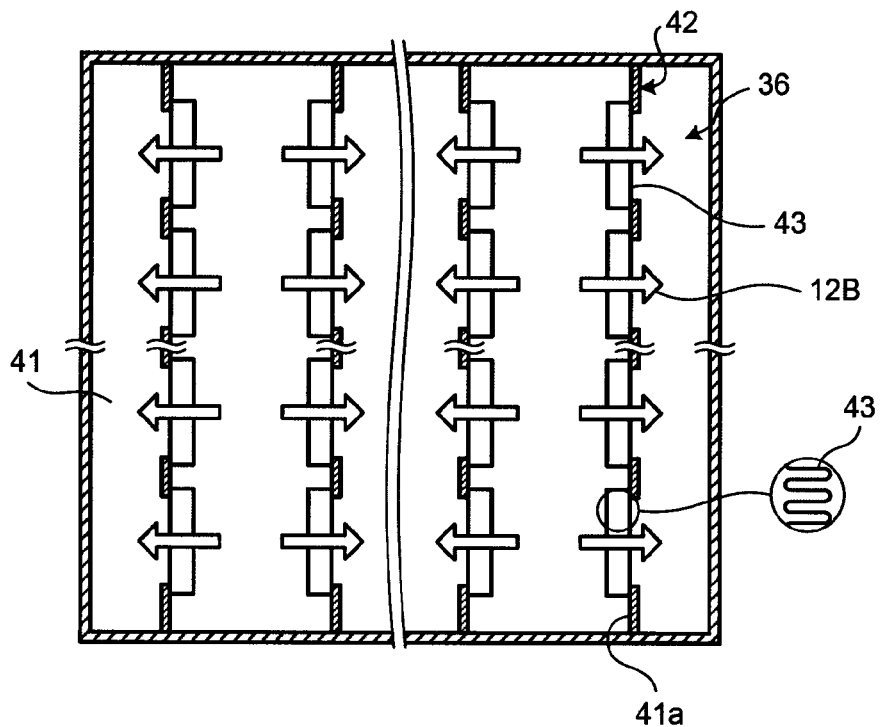
FIG. 4 is a cross-sectional view taken along a line X-X of FIG. 3.
Figure 5:
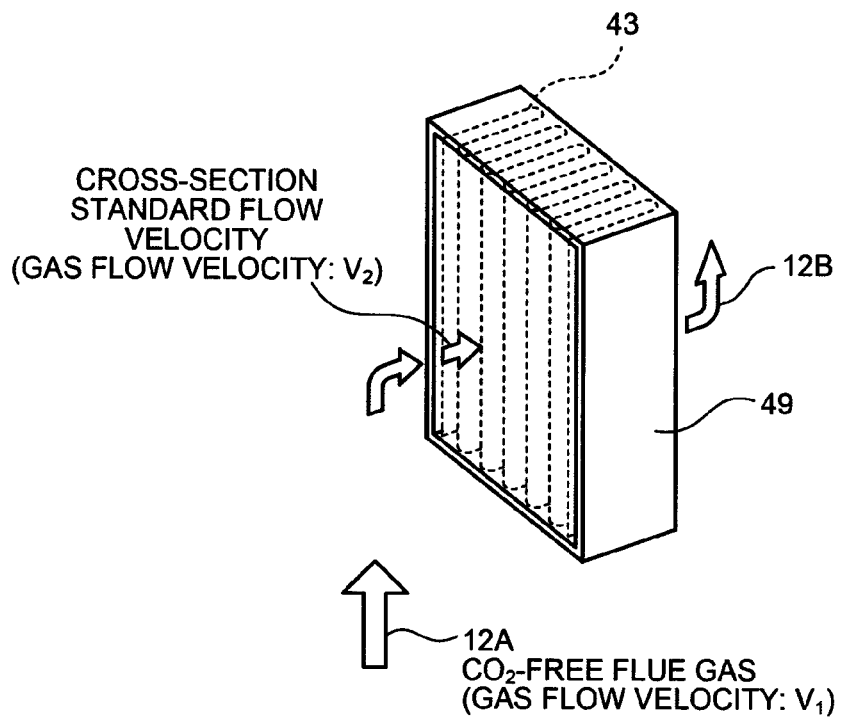
FIG. 5 is a perspective view of the water-repellent filter according to the first embodiment.
Figure 6:
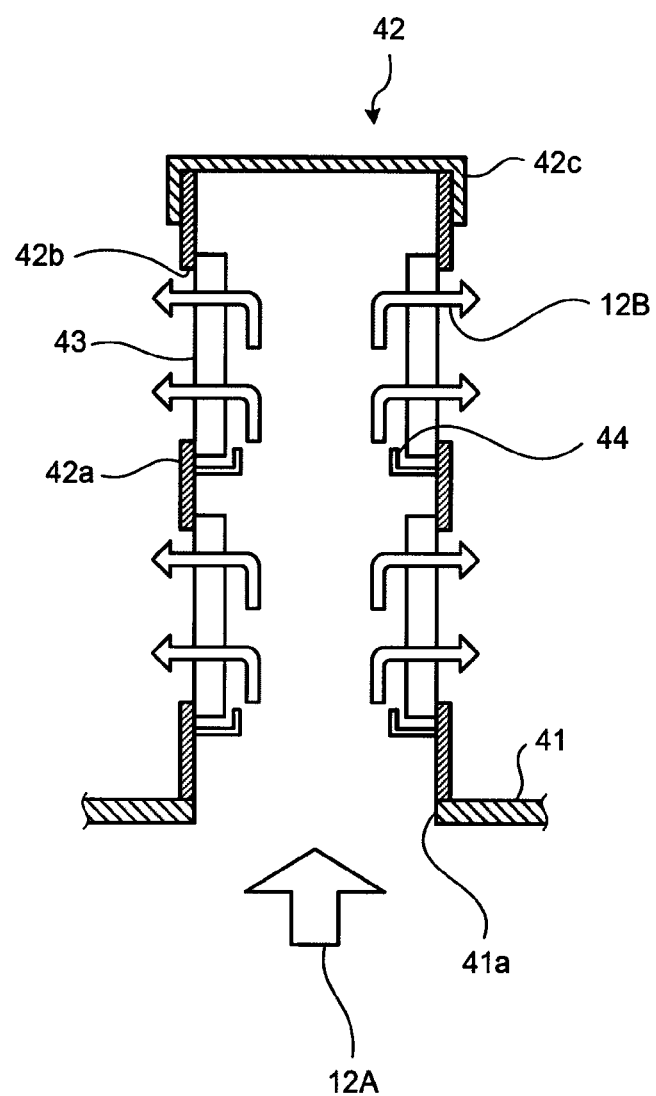
FIG. 6 is a cross-sectional view of another filter cylinder according to the first embodiment.
Figure 7:
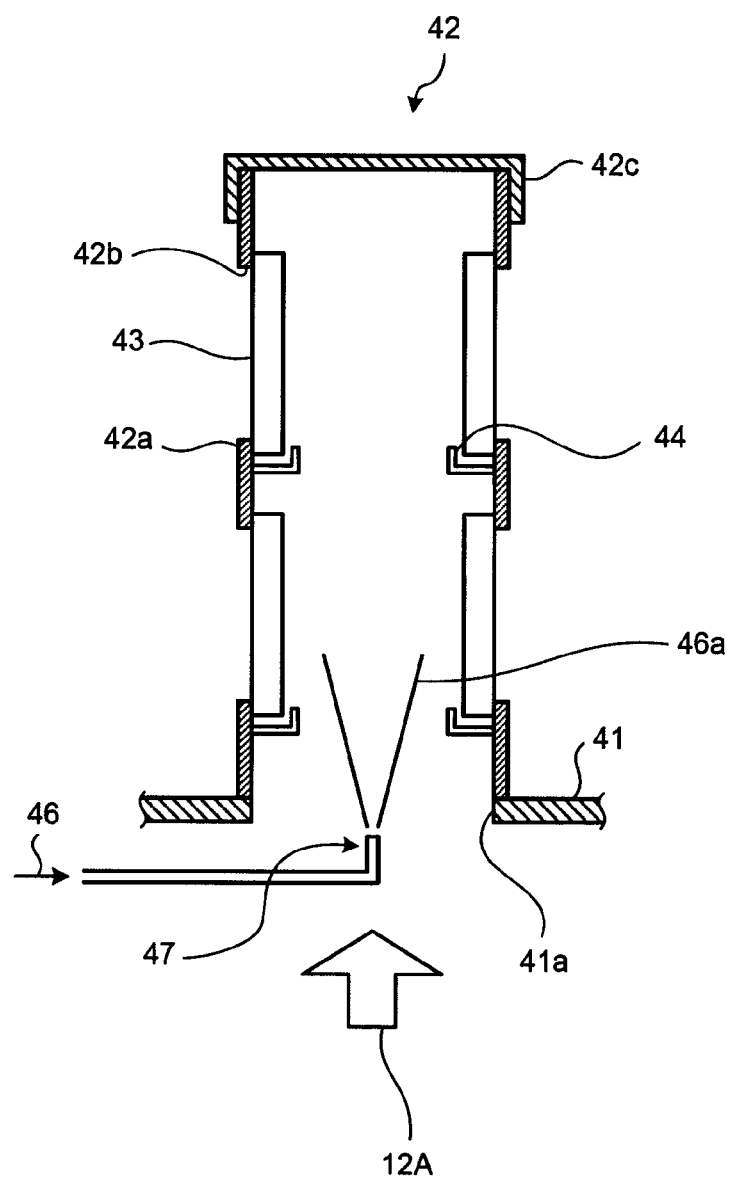
FIG. 7 is a cross-sectional view of another filter cylinder according to the first embodiment.

FIG. 2 is a perspective view of the water-repellent filter unit according to the first embodiment, FIG. 3 is a longitudinal cross-sectional view of the water-repellent filter unit according to the first embodiment. FIG. 4 is a cross-sectional view taken along a line X-X of FIG. 3. FIG. 5 is a perspective view of the water-repellent filter according to the first embodiment. FIGS. 6 and 7 are cross-sectional views of another water-repellent filter unit according to the first embodiment.

As illustrated in these drawings, the water-repellent filter unit 36 is provided with a filter cylinder 42 having a gas introduction space S into which the $CO_2$-free flue gas 12A rising from the $CO_2$ absorption unit 34 is introduced, and a plurality of water-repellent filters 43 that is provided on a side surface 42a of the filter cylinder 42 to allow the introduced $CO_2$-free flue gas 12A to pass in a direction orthogonal to a gas flow direction.

The filter cylinder 42 has the introduction space S into which the $CO_2$-free flue gas 12A is introduced from at least one openings 41a that are provided in a filter base 41 orthogonal to the gas flow direction of the $CO_2$-free flue gas 12A rising from the $CO_2$ absorption unit 34.

The upper side of the gas introduction space S is closed by a ceiling surface 42c provided on a ceiling side of the side surface 42a.

Furthermore, on the side surface 42a of the filter cylinder 42, the plurality of water-repellent filters 43, through which the introduced $CO_2$-free flue gas 12A passes in a direction orthogonal to the gas rising direction, is provided.

The water-repellent filter 43 is installed on a plurality of openings 42b provided on the side surface 42a of the filter cylinder 42 via a casing and a gasket.

The water-repellent filter 43 is disposed in a multistage in a direction of height of the side surface 42a of the filter cylinder 42 according to the flow velocity of the gas to be treated, and is configured to remove the amine mist in the $CO_2$-free flue gas 12A under the condition of a predetermined pressure loss.

In FIG. 2, reference numeral $W_1$ represents a width of the filter base 41, and $L_1$ represents a length of the filter base 41. The width and the length are the same as an inner dimension of the $CO_2$ absorber 32. Reference numeral $W_2$ represents a width of the filter cylinder 42, and $L_2$ represents a length of the filter base 41. The number of installation of the filter cylinder 42 is not limited in the present invention and can be appropriately changed in consideration of the amount of gas to be treated, the pressure loss, or the like.

As illustrated in FIG. 3, in the water-repellent filter unit 36, the filter base 41, which is installed within the tower of the $CO_2$ absorber 32 to block the gas flow of the $CO_2$-free flue gas 12A, is installed. In the filter base 41, the plurality of elongated rectangular openings 41a is provided. Moreover, in the opening 41a, the filter cylinders 42 having a rectangular cross-section are disposed, respectively, and on both side surfaces 42a of the filter cylinder 42, the plurality of water-repellent filters 43 is installed.

The water-repellent filter 43 is disposed such that its gas passage cross-section is orthogonal to the $CO_2$-free flue gas 12A.

Moreover, when the $CO_2$-free flue gas 12A passes through the water-repellent filter 43, the water-repellent filter 43 collects the mist amine absorbent accompanied by the gas, thereby further reducing the amine concentration when a purified $CO_2$-free flue gas 12B is diffused to the atmosphere.

In addition, as illustrated in FIG. 5, the water-repellent filter 43 may be configured to be equipped in a filter frame 49. In such configuration, the water-repellent filter 43 is equipped in the filter frame 49 in the alternately folded pleated shape. By weaving in the pleated shape several times, the filter area through which the $CO_2$-free flue gas 12A passes is improved.

Here, it is preferred that the gas flow velocity ($V_1$) of the $CO_2$-free flue gas 12A be approximately 2.5 m/s (a preferable range is from 2.0 to 3.0 m/s) at the flow velocity of the gas rising from the $CO_2$ absorption unit 34, and a cross-section of standard flow velocity ($V_2$) when passing through the water-repellent filter 43 be approximately 0.3 to 1.2 m/s (a preferable range is from 0.5 to 0.8 m/s).

In addition, it is preferred that the pressure loss of the water-repellent filter 43 be 30 to 120 $mmH_2O$ (a preferable range is from 40 to 80 $mmH_2O$).

Thus, in the present invention, from the viewpoint of facilitating the discharge of the collected mist, the water-repellent filter 43 is disposed so that its gas passage cross-section is orthogonal to the $CO_2$-free flue gas 12A (the water-repellent filter 43 itself is vertically disposed).

This is because, when the gas passage cross-section is horizontally disposed with respect to the $CO_2$-free flue gas 12A (the water-repellent filter 43 itself is horizontally disposed), the discharge of the collected mist is poor, the pressure loss increases, and the amount of process gas decreases, which is not preferable.

In addition, as in the present embodiment, in addition to a complete vertical disposition, the water-repellent filter 43 may be obliquely disposed such that the opposite side surfaces thereof have a tapered shape, for example, in a roof shape.

In the present embodiment, as illustrated in FIG. 6, as a collecting unit for collecting the falling water that falls down along the surface of the filter, for example, a trough 44 or the like may be provided on the lower end side of the water-repellent filter 43.

Figure 8:
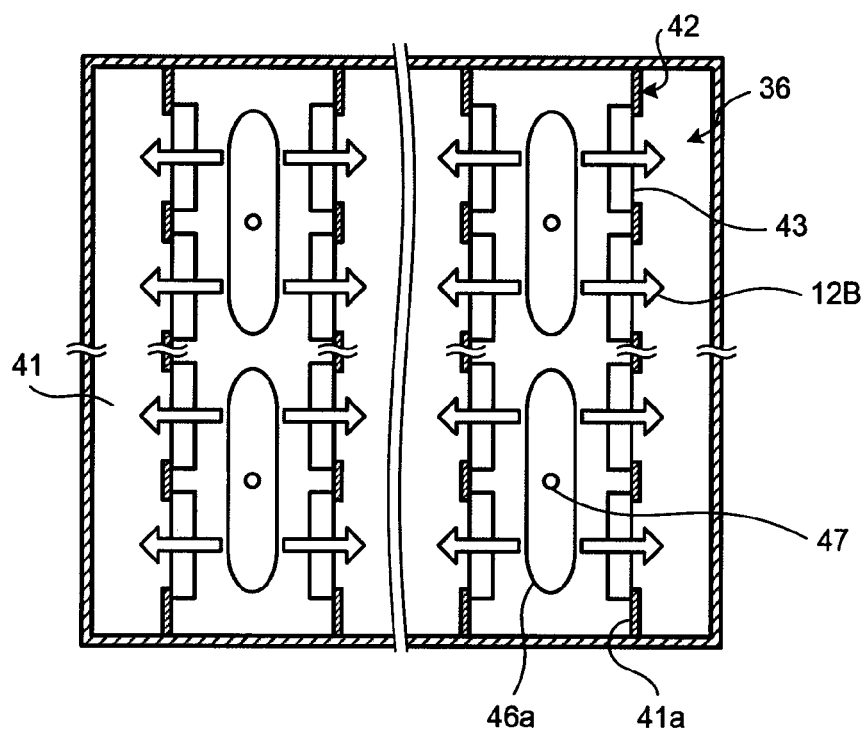
FIG. 8 is a cross-sectional view of another aspect corresponding to FIG. 4.

Furthermore, in the present embodiment, as illustrated in FIG. 7, a cleaning unit (for example, a cleaning spray, and a cleaning nozzle) 47 for cleaning the gas in-flow surface of the water-repellent filter 43 by a cleaning water 46 is installed in the filter cylinder 42. The dust adhering to the filter surface may be removed by a spraying water 46a sprayed from the cleaning unit 47. Here, FIG. 8 is a diagram corresponding to FIG. 4, and illustrates a spray region state of the spraying water 46a within the space.

Figure 9:
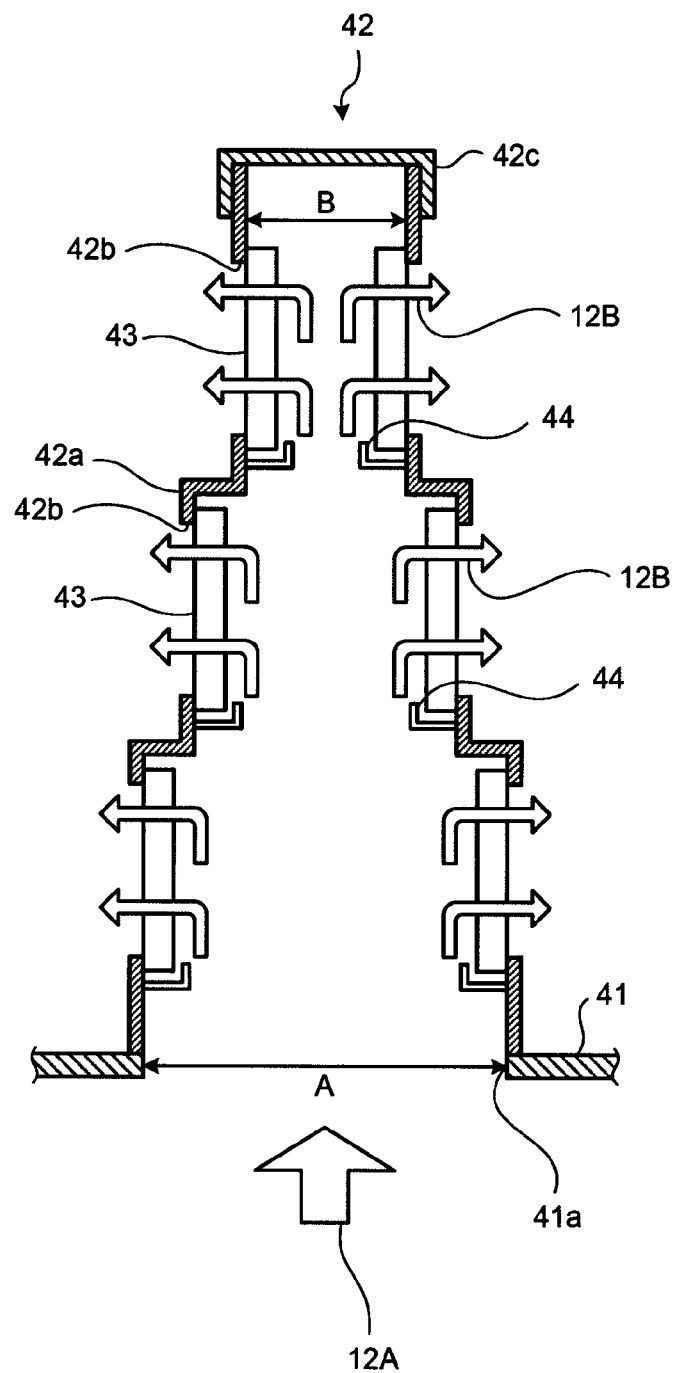
FIG. 9 is a cross-sectional view of another filter cylinder according to the first embodiment.

Furthermore, in the present embodiment, as illustrated in FIG. 9, as a shape of the filter cylinder 42 in which the water-repellent filter 43 is provided, a stepped shape may be used.

In the embodiment illustrated in FIG. 9, a width A of the opening 41a of the gas introduction side is wider than a width B of the top of the filter cylinder 42, the side surface 42a has a stepped shape, and the interval between the side surfaces facing each other is narrowed as the $CO_2$-free flue gas 12A rises.

By changing the gas in-flow space on the gas introduction side of the bottom of the filter cylinder 42, it is possible to allow the gas to more uniformly flow in the filters of each stage.

Here, it is essential in the present invention that the filter used in the water-repellent filter unit 36 have water repellency.

Figure 10:
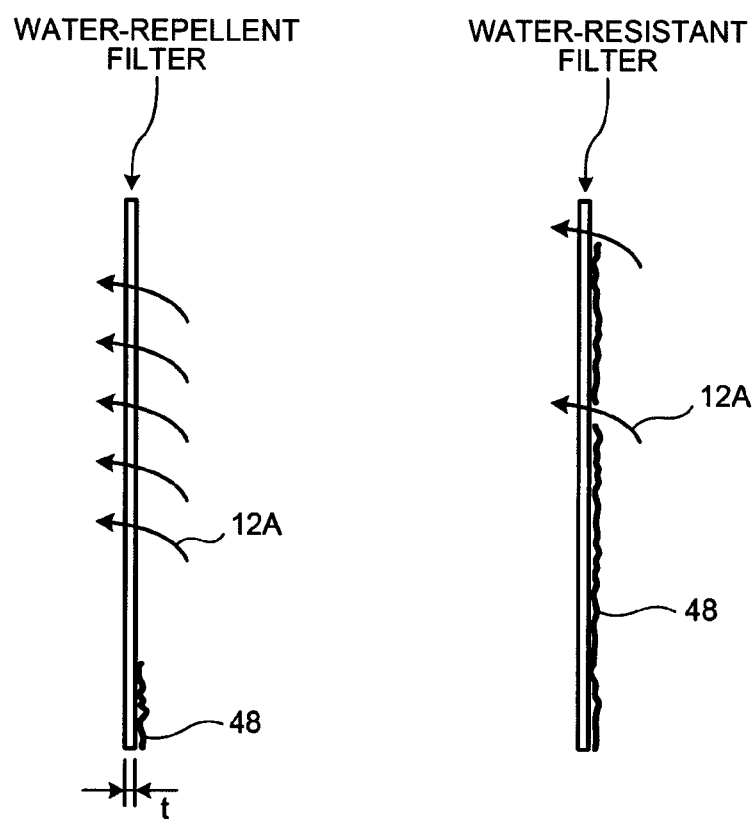
FIG. 10 is a schematic diagram illustrating an increase or decrease in a gas passage area of the filter depending on presence or absence of water-repellency.

FIG. 10 is a schematic diagram illustrating an increase or decrease in a gas passage area depending on presence or absence of water repellency.

In FIG. 10, the left side is the case of using a water-repellent filter, and the right side is the case of using a water-resistant filter. FIG. 10 illustrates a cross-section of the filter, and in the figure, reference numeral t represents a thickness of the filter, and reference numeral 48 represents a water film. Here, in FIG. 10, the right side of the filter is a space interior side of the filter cylinder 42, and the left side of the filter is an exterior.

As illustrated on the right side of FIG. 10, in the case of the water-resistant filter. Accordingly, a material thereof is glass wool having a low water repellency, the moisture accompanied by the $CO_2$-free flue gas 12A is held on the surface of the filter to become a water film 48 to block the gap of the filter passage gas part and as a result, a pressure loss increases. Thus, the water-resistant filter is not preferable.

In contrast, as in the present invention, in the case of the water-repellent filter illustrated on the left side, since the filter has water repellency, the moisture accompanied by the $CO_2$-free flue gas 12A is not held on the filter surface and falls downward, and the gap of the filter passage gas part remains. Consequently, a decrease in the gas passage area is small, the pressure loss increases but is within a tolerance, and thus, the water-repellent filter is preferable.

Therefore, in order to obtain this effect, it is preferred that the filter be vertically disposed rather than obliquely disposed.

Here, as the water-repellent filter 43, it is desirable to use a polytetrafluoroethylene (hereinafter, referred to as "PTFE") porous film having a high water repellency.

Furthermore, an average pore diameter of the porous film is about 0.01 to 10.0 μm (preferably, about 0.1 to 0.5 μm).

In addition, as the water-repellent filter 43, it is desirable that a contact angle to water be 60° or more (preferably, 90° or more).

This is because the average particle size of the mist to be collected in the $CO_2$ recovery unit is approximately 1 μm. In particular, when $SO_2$ coexists in the flue gas introduced into the $CO_2$ recovery unit, a phenomenon of an increase in the diffused amine is observed with an increase in the fine mist having the particle size of 1 μm or less (see the above-described Patent Literature 4).

Therefore, in order to increase the collection efficiency of the mist having an average particle diameter or less, the average pore size of the porous film is preferably about 0.1 to 0.5 μm.

In addition, other than a filter made of PTFE, for example, it is preferable to use a water-repellent filter obtained by coating PTFE to polyethylene, polypropylene, and a glass wool, and another water-repellent filter containing a fluorine resin. The filter may have a structure that is reinforced in combination with another low pressure loss porous material (a reinforcement material).

Figure 11:
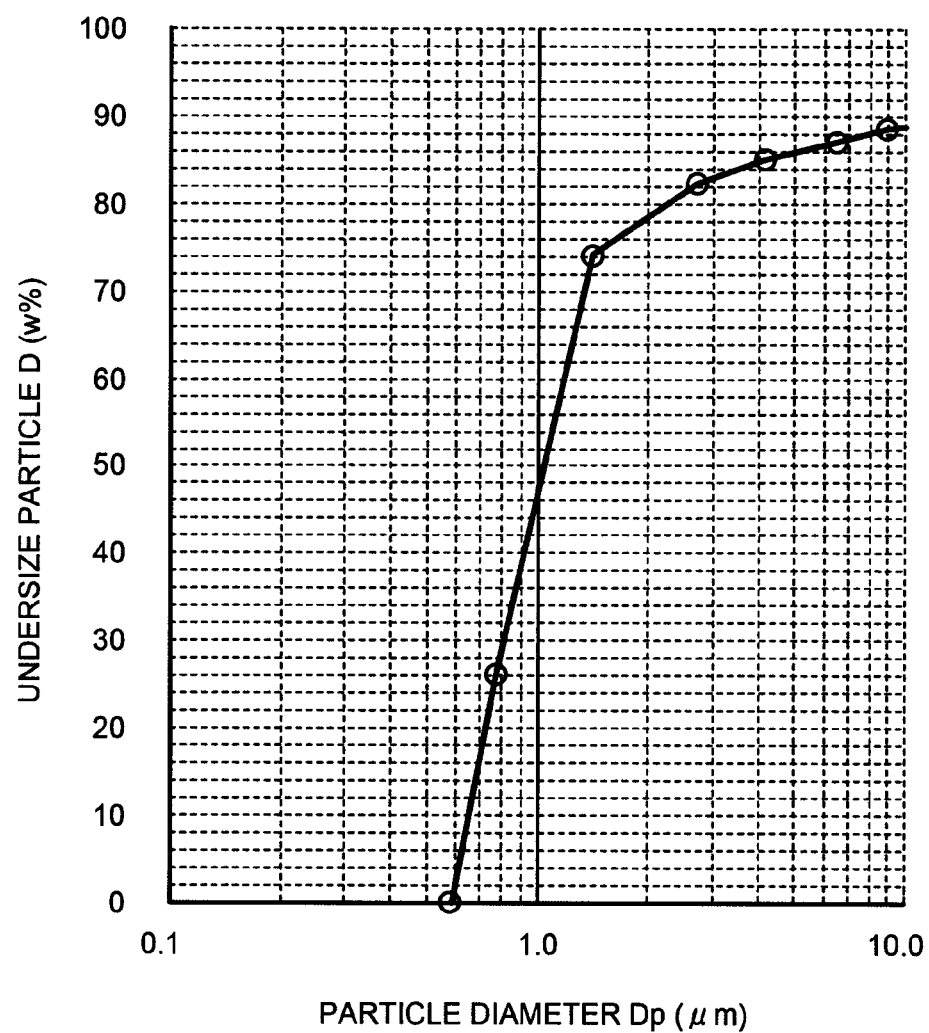
FIG. 11 is a diagram illustrating an example of the distribution of a mist particle diameter in an outlet gas of a $CO_2$ absorber.

FIG. 11 is a diagram illustrating an example of the distribution of the mist particle diameter in the outlet gas of the $CO_2$ absorber. As illustrated in FIG. 11, it is understood that the mist present in the $CO_2$-free flue gas is present as a mist state having an average particle diameter of 1 μm.

Therefore, by allowing the $CO_2$-free flue gas 12A containing the mist amine having the particle size to pass through the water-repellent filter, it is possible to collect the accompanied mist amine, thereby suppressing the release to the outside.

Figure 12:
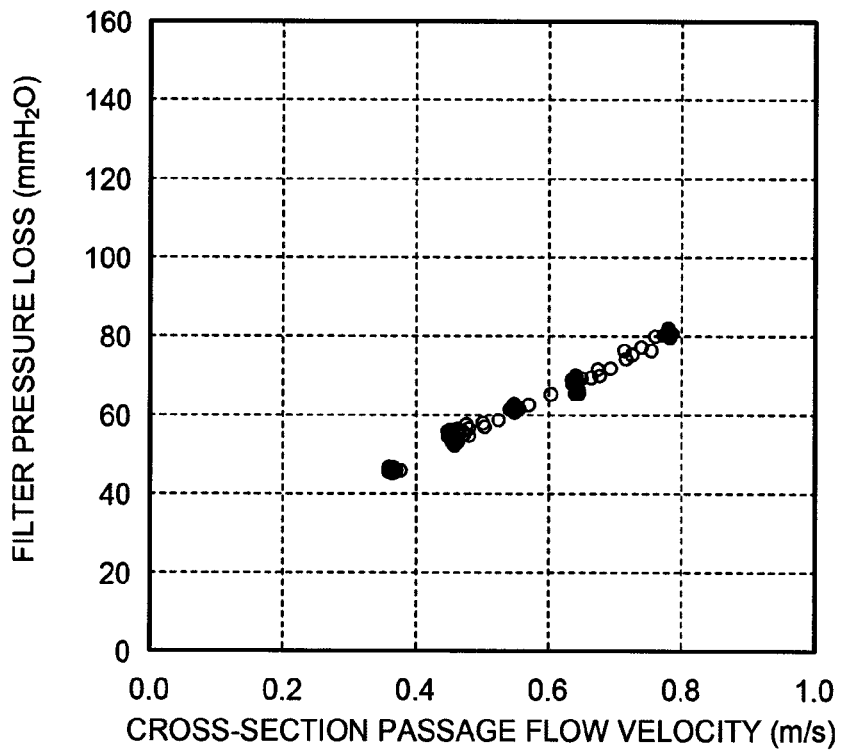
FIG. 12 is a diagram illustrating a relation between a gas passage flow velocity of the water-repellent filter and a filter pressure loss.

FIG. 12 is a diagram illustrating a relation between a gas passage flow velocity of the water-repellent filter and the filter pressure loss. The relation between the gas passage flow velocity of the water-repellent filter 43 and the filter pressure loss was obtained using a gas having the $SO_2$ concentration of 3 ppm.

As illustrated in FIG. 12, when the gas passage flow velocity increases, the pressure loss also gradually increases accordingly, but a significant pressure change was not observed.

Therefore, the gas passage flow velocity of the filter unit may be determined in consideration of the amount of gas to be treated, and the pressure loss.

Figure 13:
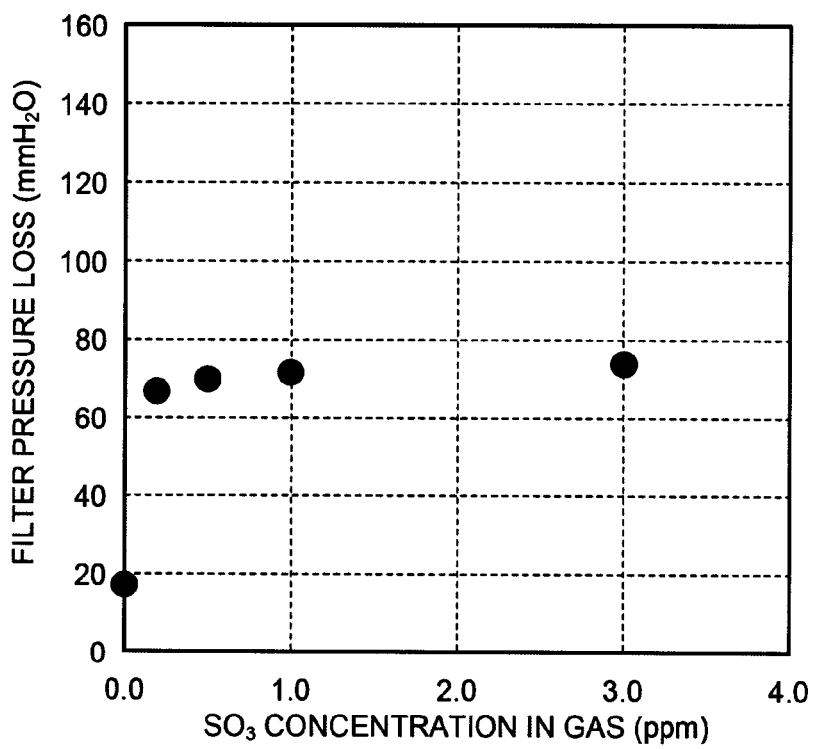
FIG. 13 is a diagram illustrating a relation between a $SO_3$ concentration in the gas and a filter pressure loss.

FIG. 13 is a diagram illustrating a relation between the $SO_3$ concentration in the gas and the filter pressure loss.

Since the gas in the $CO_2$ absorber 32 is a moisture-saturated gas, it was observed whether there was any pressure fluctuation in the filter according to the change of the $SO_3$ concentration contained in the gas. Here, the gas flow velocity was 0.35 m/s.

As illustrated in FIG. 13, it was observed that there was no significant fluctuation in the pressure loss by the filter passage even when the $SO_3$ concentration in the gas changed (0.2 to 3 ppm).

It is assumed that there is no significant fluctuation in the pressure loss as a result of the discharge due to the natural drop of the collected mist fraction along the water-repellent filter surface.

Here, in the above-described absorber 32, the flue gas 11 containing $CO_2$ introduced from the tower bottom side comes into countercurrent contact with the amine absorbent based on, for example, alkanolamine, in the $CO_2$ absorption unit 34, and $CO_2$ in the flue gas 11 is absorbed to the amine absorbent side by the chemical reaction ($R-NH_2+H_2O+ CO_2 \rightarrow R-NH_2HCO_3$).

Then, the $CO_2$-free flue gas 12A after removal of $CO_2$ rises to the water-repellent filter unit 36 side after passing through the demister 37, and the mist amine absorbent is removed by the water-repellent filter unit 36.

In the demister 37, it is possible to collect the mist having the large particle diameter generated in the filling unit or the liquid supply unit of the absorber, but for example, the collection characteristics of the fine mist caused by $SO_2$ are low. Meanwhile, since the water-repellent filter unit 36 is able to collect the fine mist, the amine concentration diffused to the atmosphere is further reduced compared to the related art when the purified $CO_2$-free flue gas 12B is discharged to the outside from the tower top of the $CO_2$ absorber 32. In the present embodiment, on the tower top side of the downstream of the water-repellent filter unit 36, a wire mesh demister 38 is provided to further collect the mist components.

This aims to reduce the concentration of the diffused amine by collecting the mist having the large particle diameter generated by re-scattering of a part of the mist collected in the water-repellent filter 43.

The rich solution 31a after absorbing $CO_2$ is increased in pressure by a rich solvent pump $P_1$ interposed in the rich solution supply line $L_1$, is heated by the lean solution 31b regenerated in the absorbent regenerator 33 in a rich-lean solution heat exchanger 39, and is supplied to the tower top side of the absorbent regenerator 33.

The rich solution 31a released to the tower interior from a tower top 33a side of the regenerator 33 releases most $CO_2$ by heating due to water vapor from the tower bottom of the regenerator 33. The introduced amine absorbent (rich solution 31a) becomes the lean solution (amine absorbent) obtained by removing almost all $CO_2$, by the time of flowing down to the tower bottom of the regenerator 33. A part of the lean solution 31b is heated by saturated water vapor 52 in a regenerative heater 51 interposed in the reboiler circulation line $L_3$. The saturated water vapor 52 after heating becomes condensed water 53.

Meanwhile, $CO_2$ gas 54, which is accompanied by the water vapor released within the tower, is discharged to the outside from the tower top 33a of the regenerator 33.

Then, the $CO_2$ gas 54 accompanied by the water vapor is derived by the gas discharge line $L_4$, the water vapor is condensed by a condenser 55 interposed in the gas discharge line $L_4$, and the condensed water is separated in a separation drum 56. The $CO_2$ gas from which the moisture is separated is released to the outside of the system, and is subjected to post-treatment such as compression and recovery, using a plurality of $CO_2$ compressors 57 interposed in the gas discharge line $L_4$. A cooler 58 is interposed between the plurality of $CO_2$ compressors 57 to cool the compressed gas.

A compressed $CO_2$ gas 59 subjected to the compression and recovery is stored, for example, in the ground or used as a high purity $CO_2$.

The condensed water separated in the separation drum 56 is supplied to the top of the absorbent regenerator 33 by a condensed water circulation pump $P_3$ interposed in the condensed water line $L_5$.

The regenerated amine absorbent (lean solution) is sent to the $CO_2$ absorber 32 side by the lean solution pump $P_2$ via the lean solution supply line $L_2$ and is heat-exchanged in the rich-lean heat exchanger 39. Subsequently, the regenerated amine absorbent is cooled to a predetermined temperature in a cooler 61, and is circulated and used as the amine absorbent (lean solution 31b).

Therefore, the amine absorbent forms a closed path that circulates through the $CO_2$ absorber 32 and the absorption solution regenerator 33, and is reused in the $CO_2$ absorption unit 34 of the $CO_2$ absorber 32. Note that an amine absorbent 31 is also supplied by a supply line (not illustrated) if necessary, and the thermostable salt in the amine absorbent is removed by a reclaimer (not illustrated) if necessary.

In the present embodiment, the water-repellent filter unit 36 having the water-repellent filters 43 is installed inside the $CO_2$ absorber 32 forming the $CO_2$ recovery unit 30. By introducing the $CO_2$-free flue gas 12A into the water-repellent filter unit 36 and causing the gas to pass through the water-repellent filters 43, it is possible to collect the mist amine accompanied by the $CO_2$-free flue gas. As a result, even when the purified $CO_2$-free flue gas 12B is released to the outside of the absorber 32, it is possible to further reduce the amine concentration diffused to the atmosphere compared to the demisters such as the conventional glass filter.

In addition, in the present embodiment, since a part of the amine absorbent and the gaseous amine absorbent is removed in the first water cleaning unit 62A prior to introduction into the water-repellent filter unit 36, load to the water-repellent filter unit 36 is reduced and the collection efficiency of the mist amine is also improved.

Second Embodiment

Next, an air pollution control system provided with a $CO_2$ recovery unit according to a second embodiment of the present invention will be described. Note that the components same as those in the first embodiment are denoted by the same reference numerals, and the description thereof will not be provided.

Figure 14:
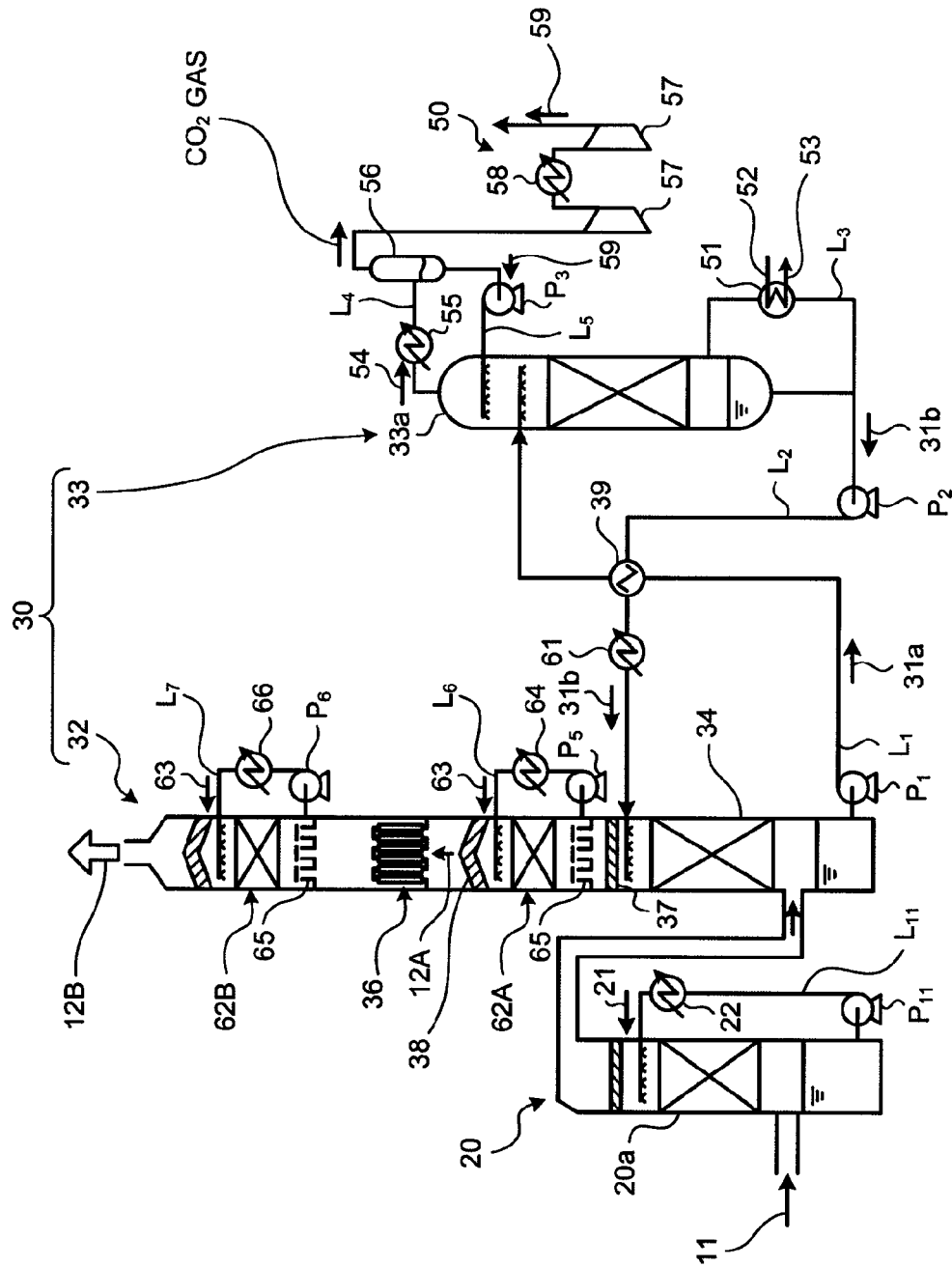
FIG. 14 is a schematic diagram of an air pollution control system provided with a $CO_2$ recovery unit according to a second embodiment.

FIG. 14 is a schematic diagram of the air pollution control system provided with the $CO_2$ recovery unit according to the second embodiment of the present invention.

As illustrated in FIG. 14, an air pollution control system 10B equipped with a $CO_2$ recovery unit 30 according to the present embodiment is provided with a second water cleaning unit 62B, on the downstream side of a water-repellent filter unit 36 in the $CO_2$ absorber 32 of the first embodiment.

In the second water cleaning unit 62B of the present embodiment, a flue gas comes into gas-liquid contact with cleaning water 63 supplied from the tower top side, the liquefied amine absorbent and the gaseous amine absorbent accompanied by $CO_2$-free flue gas 12A are removed after being removed in the water-repellent filter unit 36. Reference numeral $P_6$ represents a circulation pump, reference numeral 66 represents a cooler, and $L_7$ represents a cleaning fluid circulation line.

Installation of the second water cleaning unit 62B on the downstream side of the water-repellent filter unit 36 allows further reduction of the diffused amine concentration, compared to the first embodiment, by collecting the re-scattered mist from a water-repellent filter 43 and the re-scattered amine components evaporated from the mist collected in the water-repellent filter 43.

Third Embodiment

Next, an air pollution control system provided with a $CO_2$ recovery unit according to a third embodiment of the present invention will be described. Note that the components same as those in the first and second embodiments are denoted by the same reference numerals, and the description thereof will not be provided.

Figure 15:
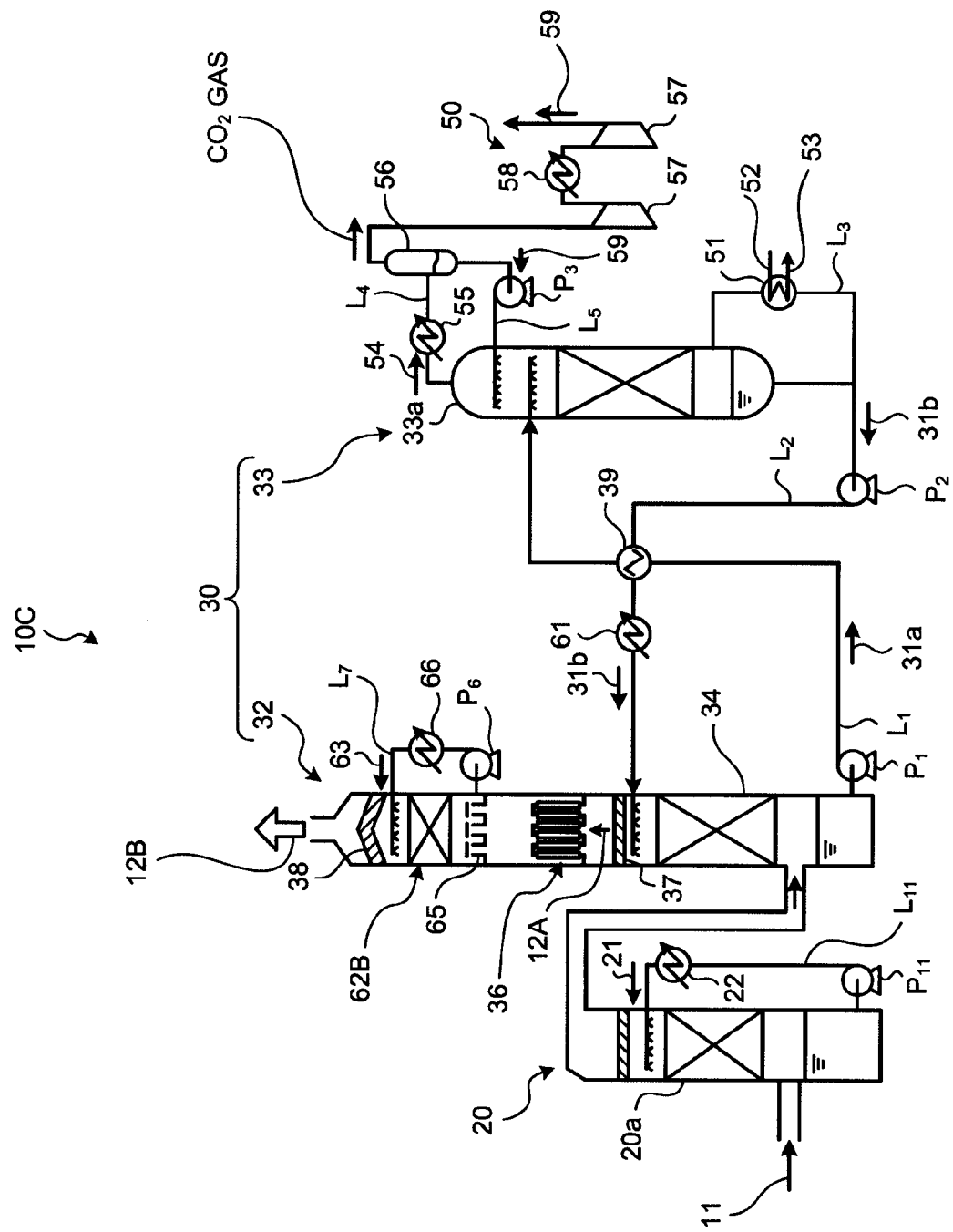
FIG. 15 is a schematic diagram of the air pollution control system provided with a $CO_2$ recovery unit according to a third embodiment.

FIG. 15 is a schematic diagram of the air pollution control system provided with the $CO_2$ recovery unit according to the third embodiment of the present invention.

As illustrated in FIG. 15, an air pollution control system 10C equipped with a $CO_2$ recovery unit 30 according to the present embodiment is provided with a second water cleaning unit 62B, on the downstream side of the gas flow of the water-repellent filter unit 36 in the $CO_2$ absorber 32 of the first embodiment.

In the present embodiment, it is possible to further reduce the diffused amine concentration compared to the first embodiment, by collecting the re-scattered mist from a water-repellent filter 43 and the amine components generated by evaporation from the mist collected by the water-repellent filter 43 in the second water cleaning unit 62B.

Fourth Embodiment

Next, an air pollution control system provided with a $CO_2$ recovery unit according to a fourth embodiment of the present invention will be described. Note that the components same as those in the first to third embodiments are denoted by the same reference numerals, and the description thereof will not be provided.

Figure 16:
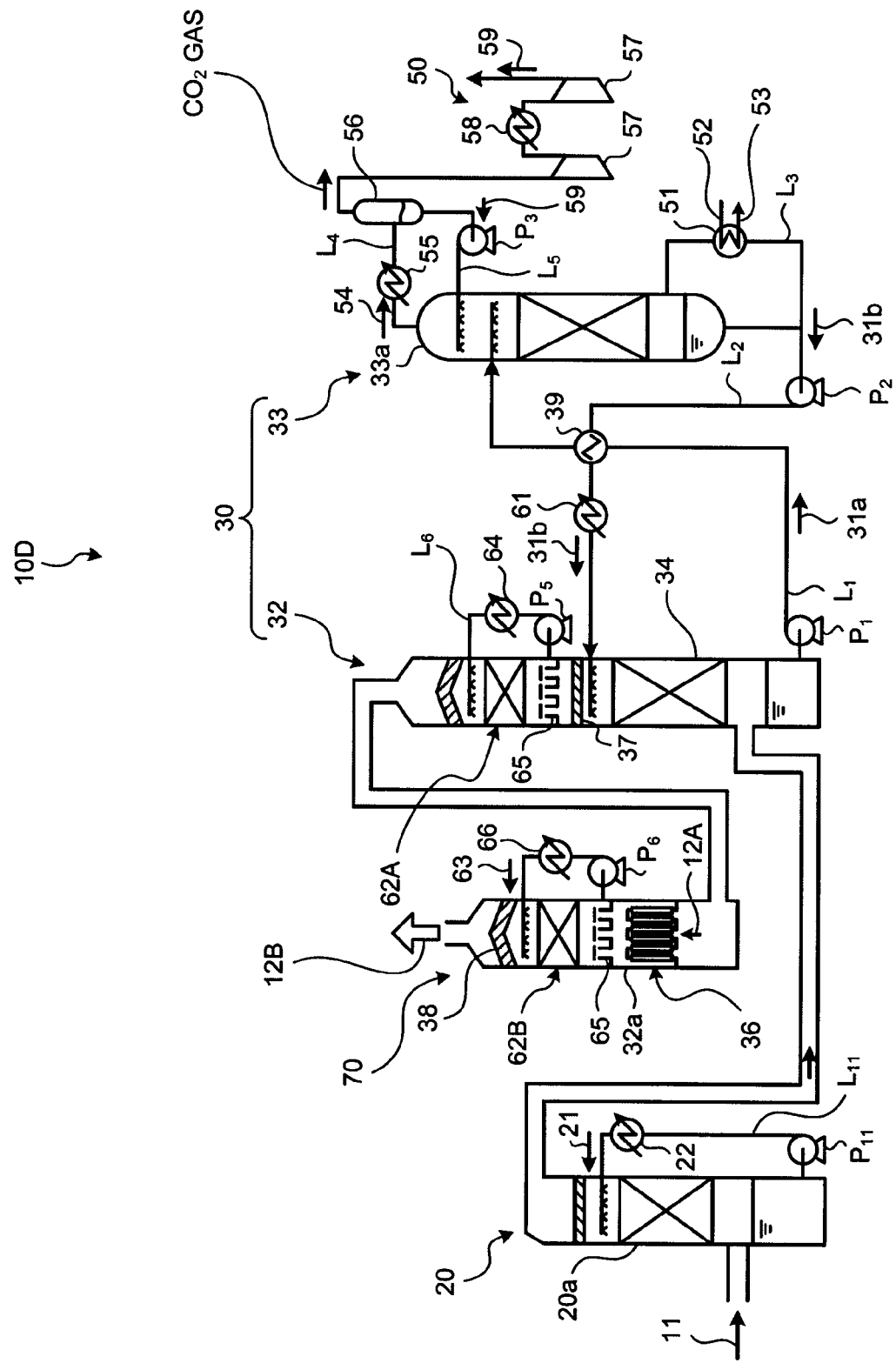
FIG. 16 is a schematic diagram of an air pollution control system provided with a $CO_2$ recovery unit according to a fourth embodiment.

FIG. 16 is a schematic diagram of the air pollution control system equipped with the $CO_2$ recovery unit according to the fourth embodiment of the present invention.

As illustrated in FIG. 16, in an air pollution control system 10D equipped with a $CO_2$ recovery unit 30 according to the present embodiment, a water-repellent filter unit 36 and a second water cleaning unit 62B installed in the $CO_2$ absorber 32 of the second embodiment 2 are provided in a gas cleaning tower 70, which is separately placed.

This configuration avoids an increase in the vertical placement of the $CO_2$ absorber 32.

Furthermore, by using the conventional $CO_2$ absorber 32, and by separately additionally providing the gas cleaning tower 70 on which the water-repellent filter unit 36 and the second water cleaning unit 62B of the present embodiment are disposed, it is possible to further reduce the diffused amine concentration without a large modification.

Note that, even in the first, second, and third embodiments, the water-repellent filter unit 36 may be provided in a gas cleaning tower 70 installed outside the $CO_2$ absorber 32.

EXAMPLE

Hereinafter, Examples illustrating the effects of the present invention will be described. However, the present invention is not limited thereto.

As Example 1, as a mist removal unit, a glass fiber filter (GS) was installed in a first stage, the water-repellent filter unit 36 of the water-repellent filter was installed in a second stage of the downstream side of the gas flow, and a wire mesh demister (MD) was installed in a third stage of the downstream side of the gas flow.

As Example 2, as a mist removal unit, a glass fiber demister (GD) was installed in the first stage, the water-repellent filter unit 36 of the water-repellent filter was installed in the second stage of the downstream side of the gas flow, and a glass fiber demister (GD) was installed in the third stage of the downstream side of the gas flow.

As Comparative Example 1, as a mist removal unit, the glass fiber demister (GD) was installed in the first stage, and the wire mesh demister (MD) was installed in the second stage of the downstream side of the gas flow.

As Comparative Example 2, as the mist removal unit, the glass fiber demister (GD) was installed in the first stage, the wire mesh demister (MD) was installed in the second stage of the downstream side of the gas flow, and the glass fiber demister (GD) was installed in the third stage of the downstream side of the gas flow.

As Comparative Example 3, as the mist removal unit, the glass fiber demister (GD) was installed in the first stage, a water-resistant filter was installed in the second stage of the downstream side of the gas flow, and the wire mesh demister (MD) was installed in the third stage of the downstream side of the gas flow.

The diffused amine concentration was measured under the conditions where the $SO_3$ mist concentration in the gas was set to 1 ppm and 3 ppm. The results are illustrated in Table 1.

TABLE 1

| | Mist removal unit | | | Diffused amine concentration | |
| --- | --- | --- | --- | --- | --- |
| | First stage | Second stage | Third stage | $SO_3$: 1 ppm | $SO_3$: 3 ppm |
| Example 1 | GS | Water-repellent filter | MD | 0.7 | 1 |
| Example 2 | GD | Water-repellent filter | GD | 0.15 | 0.3 |
| Comparative Example 1 | GD | MD | — | 20 | 37 |
| Comparative Example 2 | GD | MD | GD | 2 | 7 |
| Comparative Example 3 | GD | Water-repellent filter | MD | — | — |

GD: glass fiber demister
MD: wire mesh demister
Water-repellent filter
Water-resistant filter As illustrated in Table 1, in Comparative Example 1 of the related art, when the $SO_3$ mist concentration was 1 ppm, the amine concentration of absorber outlet was 20 ppm.

In Comparative Example 1 of the related art, when the $SO_3$ mist concentration was 3 ppm, the amine concentration of absorber outlet was 37 ppm.

As in Comparative Example 2, when the $SO_3$ mist concentration was 1 ppm, even in a case where the glass fiber demister (GD) was installed in the third stage, the amine concentration of the absorber outlet was lowered only to 2 ppm.

Furthermore, as in Comparative Example 2, when the $SO_3$ mist concentration was 3 ppm, even in a case where the glass fiber demister (GD) was installed in the third stage, the amine concentration of the absorber outlet was lowered only to 7 ppm.

In contrast, as in Example 1, in a case where the water-repellent filter was installed in the second stage and the wire mesh demister (MD) was installed in the third stage, when the $SO_3$ mist concentration was 1 ppm, the amine concentration of the absorber outlet was significantly lowered to 0.7 ppm. Furthermore, when the $SO_3$ mist concentration was 3 ppm, the amine concentration of the absorber outlet was significantly lowered to 1.0 ppm.

As in Example 2, in a case where the water-repellent filter was installed in the second stage and the glass fiber demister (GD) was installed in the third stage, when the $SO_3$ mist concentration was 1 ppm, the amine concentration of the absorber outlet was further lowered to 0.15 ppm. Furthermore, when the $SO_3$ mist concentration was 3 ppm, the amine concentration of the absorber outlet was significantly lowered to 0.3 ppm.

As in Comparative Example 3, in a case where the water-resistant filter was installed, the filter pressure loss increased, and the measurement was not possible.

Thus, when using the water-repellent filter as in the present invention, it was observed that it is possible to collect the mist amine accompanied by the $CO_2$ flue gas and to further reduce the concentration of amine diffused to the atmosphere.

REFERENCE SIGNS LIST 10A to 10D AIR POLLUTION CONTROL SYSTEM
11 COAL COMBUSTION FLUE GAS (FLUE GAS)
12A $CO_2$-FREE FLUE GAS
12B PURIFIED $CO_2$ FLUE GAS
20 COOLING TOWER
30 $CO_2$ RECOVERY UNIT
32 $CO_2$ ABSORBER
33 ABSORBENT REGENERATOR
34 $CO_2$ ABSORPTION UNIT
36 WATER-REPELLENT FILTER UNIT
41 FILTER BASE
42 FILTER CYLINDER
43 WATER-REPELLENT FILTER
44 TROUGH
46 CLEANING WATER
47 CLEANING unit
50 CO2 COMPRESSION APPARATUS
62A FIRST WATER CLEANING UNIT
62B SECOND WATER CLEANING UNIT

The invention claimed is:

1. An air pollution control system comprising a $CO_2$ recovery unit equipped with a $CO_2$ absorber that removes $CO_2$ in a flue gas from a boiler by an amine absorbent, and an absorbent regenerator that regenerates the amine absorbent,
  wherein the $CO_2$ absorber is equipped with a $CO_2$ absorption unit that absorbs $CO_2$ in the flue gas by the amine absorbent,
  a water-repellent filter unit that collects mist amine absorbent accompanied by a $CO_2$-free flue gas is disposed on a gas flow downstream side of the CO2 absorption unit, wherein the water-repellent filter unit is equipped with a filter cylinder having a gas introduction space into which the $CO_2$-free flue gas rising from the $CO_2$ absorption unit is introduced, and a plurality of water-repellent filters provided on a side surface of the filter cylinder to allow the introduced $CO_2$-free flue gas to pass through the filters in a direction orthogonal to a gas flow direction,
  a first water cleaning unit, provided between the $CO_2$ absorption unit and the water-repellent filter unit, in which the flue gas comes into gas-liquid contact with a cleaning water and a gaseous amine absorbent accompanied by the $CO_2$-free flue gas is removed prior to introduction into the water-repellent filter unit,
  a demister that collects mist having a large particle diameter is provided in a gas flow downstream side of the water cleaning unit, and
  a wire mesh demister that collects mist generated by re-scattering is provided on a tower top side of a downstream side of the water-repellent filter unit.

2. The air pollution control system according to claim 1, wherein a cleaning unit for cleaning a gas in-flow surface of the water-repellent filter is provided in the filter cylinder.

3. The air pollution control system according to claim 1, wherein a collecting unit for collecting falling water falling down along the surface of the filter is provided on a lower end side of the water-repellent filter.

4. The air pollution control system according to claim 1, wherein the water-repellent filter unit is integrally provided within the $CO_2$ absorber.

5. The air pollution control system according to claim 1, wherein the water-repellent filter unit is provided separately from the $CO_2$ absorber.

6. The air pollution control system according to claim 1, further comprising a second water cleaning unit provided on a downstream side of the gas flow of the water-repellent filter unit.

* * * * *